United States Patent
Lu

Patent Number: 5,651,531
Date of Patent: Jul. 29, 1997

[54] WATER FLOW CONTROL DEVICE

[76] Inventor: Ke-Way Lu, 3F, No. 322, Sec. 6, Min-Chuan E. Rd. (Green Lake Mansion), Taipei City, Taiwan

[21] Appl. No.: 585,722

[22] Filed: Jan. 16, 1996

[51] Int. Cl.⁶ .................................................. F16K 31/44
[52] U.S. Cl. .......................... 251/229; 4/678; 74/110; 74/575; 137/801; 239/583; 251/230; 251/319; 251/339
[58] Field of Search ............................ 4/678; 137/798, 137/801, 901; 239/583; 251/230, 251, 319, 339, 347, 229; 74/575, 110

[56] References Cited

U.S. PATENT DOCUMENTS

| | | | |
|---|---|---|---|
| 3,220,695 | 11/1965 | Downey et al. | 251/230 |
| 3,333,815 | 8/1967 | Downey et al. | 251/230 |
| 4,181,987 | 1/1980 | Kesselman | 137/901 |
| 4,456,222 | 6/1984 | Shen | 251/230 |
| 4,667,349 | 5/1987 | Son | 137/801 |
| 4,771,985 | 9/1988 | Gross et al. | 251/230 |
| 4,840,351 | 6/1989 | Lii | 251/230 |
| 4,981,160 | 1/1991 | Sen-Tein | 137/801 |
| 5,067,517 | 11/1991 | Ting-Chih et al. | 137/801 |
| 5,361,804 | 11/1994 | Keller et al. | 137/801 |
| 5,456,448 | 10/1995 | Chou | 251/230 |

*Primary Examiner*—George L. Walton
*Attorney, Agent, or Firm*—Ladas & Parry

[57] ABSTRACT

A water flow control device which includes a cup-like mounting base fastened to the water discharging pipe of a water supply system, a casing fastened to the cup-like mounting base, a valve stem mounted inside the cup-like mounting base and the casing and moved to open/close the waster passage between the cup-like mounting base and the casing, a control rod mounted in the casing for moving by hand, a rotary actuating rod coupled between the valve stem and the control rod and moved by the control rod to force the valve stem into the open position or the close position, and a locating mechanism made on the inside of an upright inside tube inside the casing for holding the control rod and the rotary actuating rod in place.

4 Claims, 5 Drawing Sheets

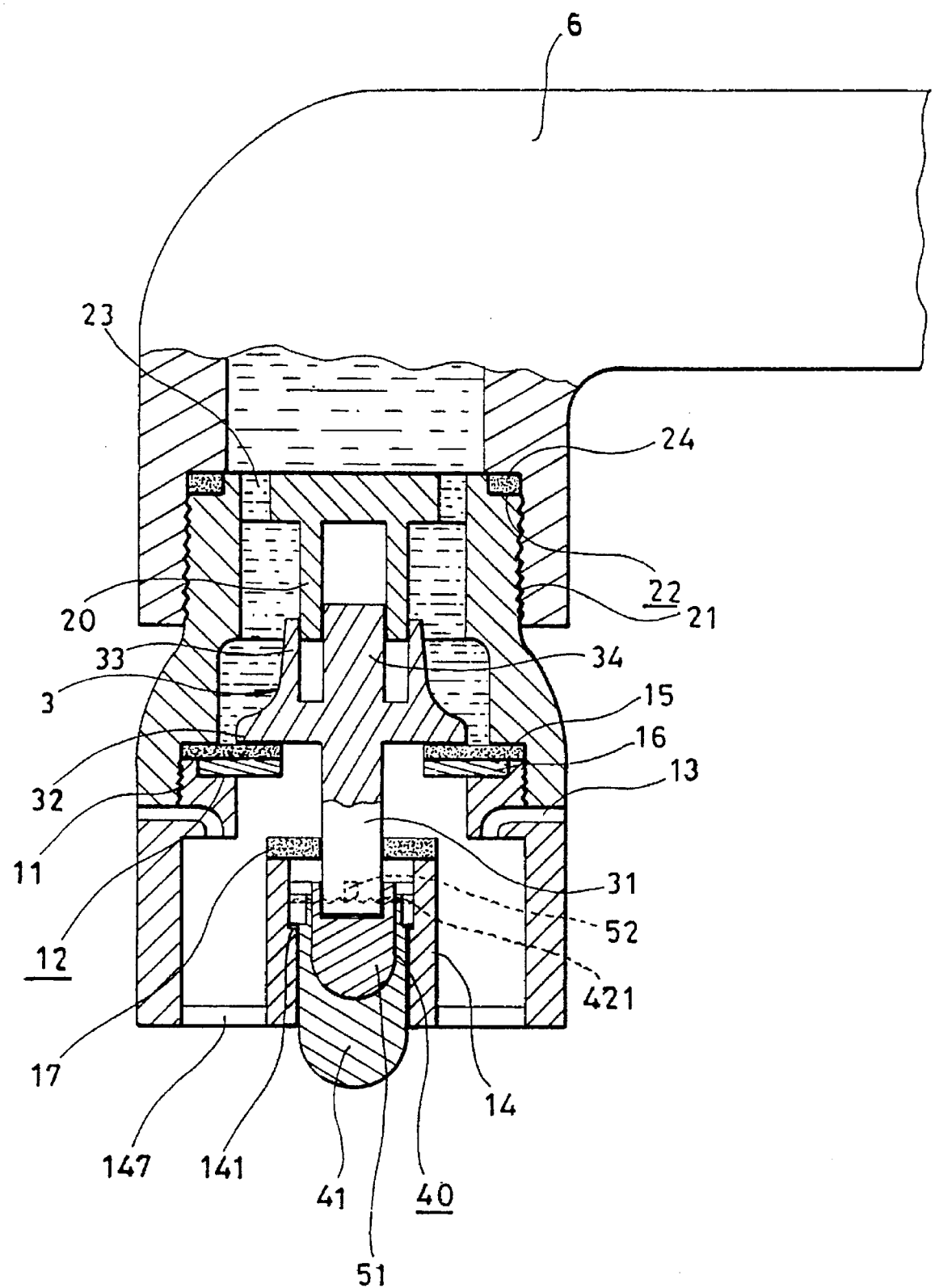
F I G. 2

5,651,531

WATER FLOW CONTROL DEVICE

BACKGROUND OF THE INVENTION

The present invention relates to water flow control devices, and relates more particularly to such a water flow control device which has a control rod projecting out of the casing thereof and moved to drive the valve stem between the close position and the open position.

A variety of mechanical water flow control devices have been disclosed, and have appeared on the market. These mechanical water flow control devices commonly use a rotary handle or lifting lever to move a valve stem between the close position and the open position. Because the rotary handle or lifting lever must be moved in the reversed direction to close the valve stem after washing, the washed hand tends to be contaminated when turning the rotary handle or lifting lever. There are known various infrared-induced water flow control devices which eliminate the aforesaid problem. These water flow control devices automatically open the water passage upon the presence of the hand. However, these infrared-induced water flow control devices are commonly expensive and not durable in use. FIG. 5 shows a touch control type water flow rate control device according to the prior art, which comprises a casing defining a main water passage consisting of a vertical water passage and a horizontal water passage extending from the vertical water passage at one side, an upper valve and a lower valve installed in a vertical water passage, a water discharging port at the bottom end of the main water passage, a connecting rod connected between the upper valve and the lower valve, an auxiliary water passage defined inside the casing and having a top end connected to the top end of the main water passage above the upper water valve and a bottom end connected to the water discharging port, a relief valve to close the passage between the main water passage and the auxiliary water passage, and a handle pivoted to the casing. The handle has one end connected to the relief valve, and an opposite end extending out of the casing. The upper valve seals the vertical water passage. The lower valve seals the water discharging port. When the handle is touched by hand to open the relief valve, water is released from the vertical water passage to the auxiliary water passage, causing a reducing of the pressure of water above the upper valve. The upper valve and the lower valve are lifted due to a pressure difference. When the lower valve is lifted, water is allowed to discharge out of the water discharging port. When the handle is touched again to force the relief valve back to the close position, the pressure difference disappears, and the lower valve is lowered to close the water discharging port again. This structure of touch control type water flow control device is functional. However, because the handle has a certain length outside the casing, it tends to be triggered by an error to open the relief valve, causing water to be discharged out of the casing. Furthermore, this structure of water flow control device cannot be directly installed in the faucet of an existing water supply system.

SUMMARY OF THE INVENTION

It is one object of the present invention to provide a water flow control device which can be directly fastened to the inner thread of the water discharging pipe of a faucet or water supply system. It is another object of the present invention to provide a water flow control device which is controlled to open/close the water passage by a touch control. According to the preferred embodiment of the present invention, the water flow control device comprises a cup-like mounting base fastened to the water discharging pipe of a faucet or water supply system and sealed by a water sealing ring, having a downward tubular holder on the inside, and a water input port for passing water from the water discharging pipe; a hollow cylindrical casing fastened to the cup-like mounting base having a water discharging port at a bottom side thereof and an upright inside tube located in the water discharging port and held in position by radial ribs, the upright inside tube having an inside annular flange near a bottom side thereof; an annular water sealing rubber fastened to the topmost edge of the upright inside tube; a plastic washer mounted inside the casing above the annular water sealing rubber; an annular rubber gasket mounted in the casing and supported by the plastic washer, defining a water passage for guiding water from the water input port of the cup-like mounting base to the water discharging port of the casing; a valve element slidably coupled to the downward tubular holder of the cup-like mounting base and moved vertically to close/open the water passage of the annular rubber gasket; a control rod mounted in the casing for moving by hand, the control rod having a head stopped above the inside annular flange of the upright inside tube and a rod body projecting out of the casing; a rotary actuating rod coupled to the control, rod and moved by it between a first position in which the valve element is moved to open the water passage of the annular rubber gasket, and a second position in which the valve element is moved to close the water passage of the annular rubber gasket; and a locating mechanism on the inside of the upright inside tube for holding the control rod and the rotary actuating rod between the first position and the second position.

BRIEF DESCRIPTION OF THE DRAWINGS

FIG. 2 is a sectional assembly view, of the water flow, control device shown in FIG. 1, showing the water passage closed;

DETAILED DESCRIPTION OF THE PREFERRED EMBODIMENT

Figure 1:
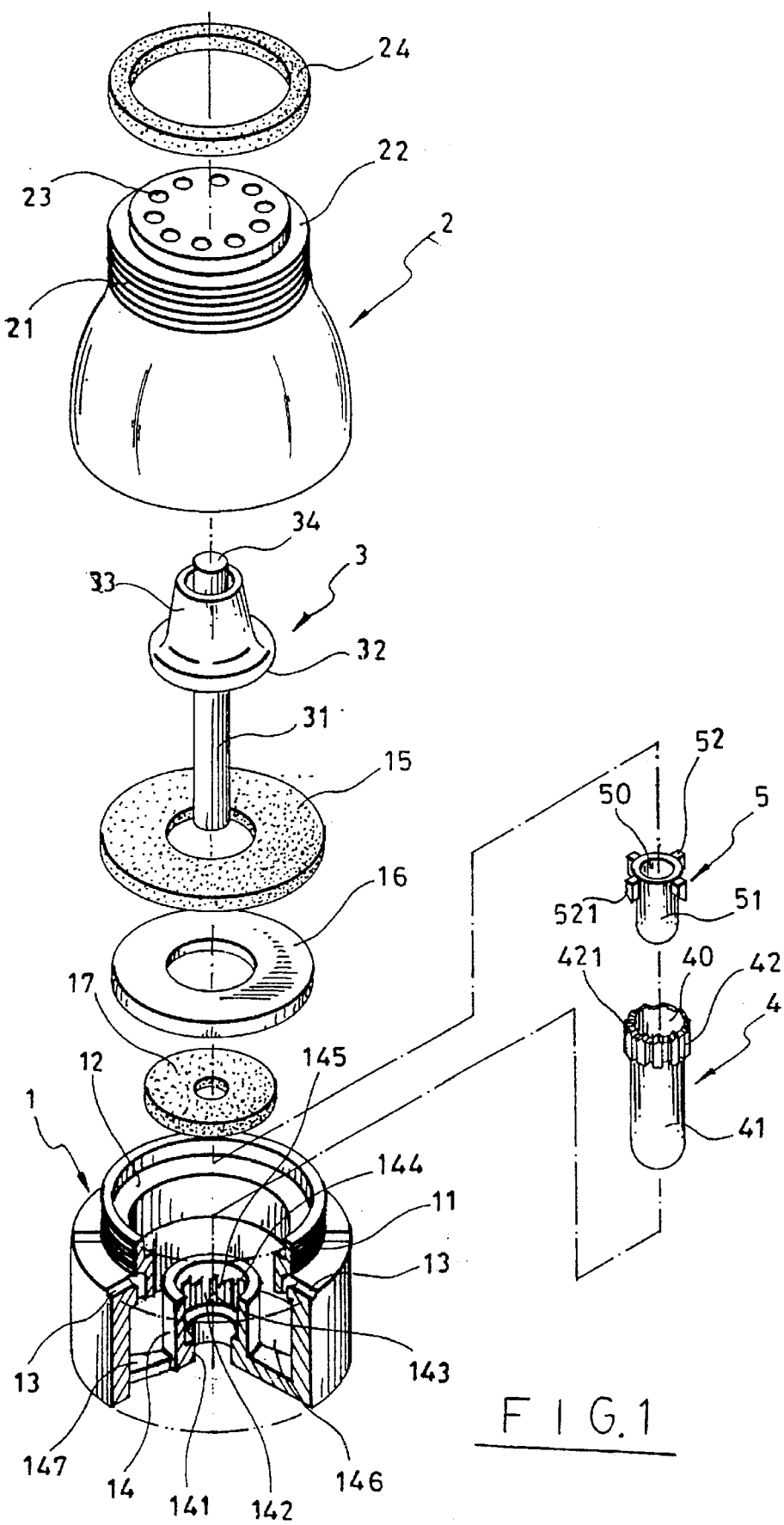
FIG. 1 is an exploded view of a water flow control device according to the present invention.

Referring to FIGS. 1 and 2, a water flow control device in accordance with the present invention is generally comprised of a casing 1, a cup-like mounting base 2, a valve element 3, a control rod 4, a rotary actuating rod 5, and a locating mechanism made on the inside of the casing 1. The casing 1 is made of hollow cylindrical shape comprising a plurality of radial air vents 13 for the passing of air between the inside of the casing 1 and the outside thereof, a threaded mounting neck 11 for fastening to the cup-like mounting base 2, an inside annular flange 12 raised around the threaded mounting neck 11 on the inside for mounting a plastic washer 16 and an annular rubber gasket. 15 above the plastic washer 16, an upright inside tube 14 extending upwardly from the outlet end of the casing 1 along a center axis, a water discharging port 146 at the bottom side around the upright inside tube 14, and a plurality of radial ribs 147 connected between the bottom end of the upright inside tube 14 and the bottom end of the casing 1 in the water discharging port 146. The top end of the upright inside tube 14 is sealed by an annular water sealing rubber 17, which is disposed at its upper end intermediate the casing 1 for receiving the valve element 3. The upright inside tube 14 has an inside annular flange 141 around the inside wall at the bottom side.

Figure 4:
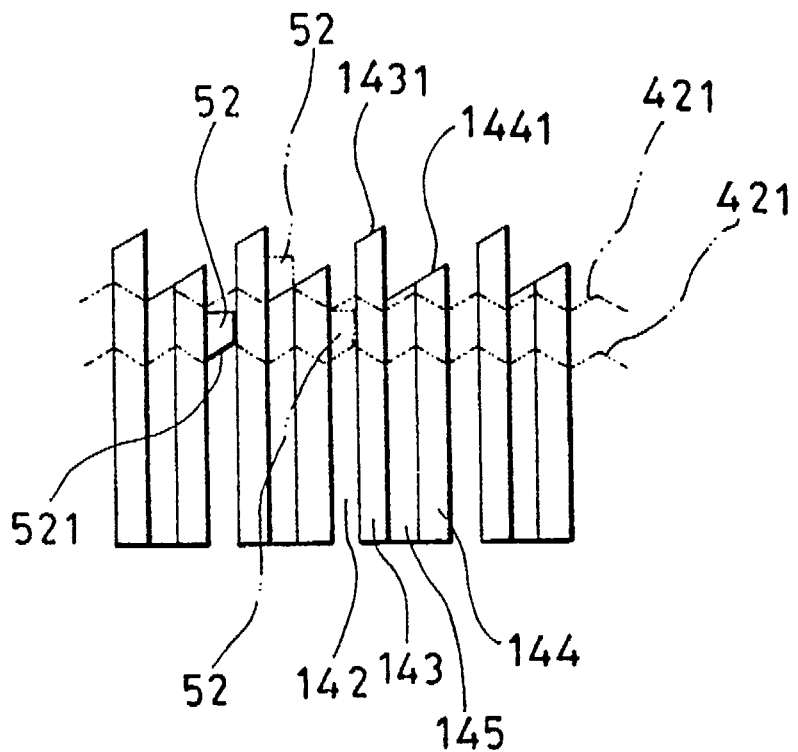
FIG. 4 is an expanded plain view showing the position of the locating blocks of the rotary actuating rod relative to the longitudinal rails of the upright inside tube.
Figure 5:
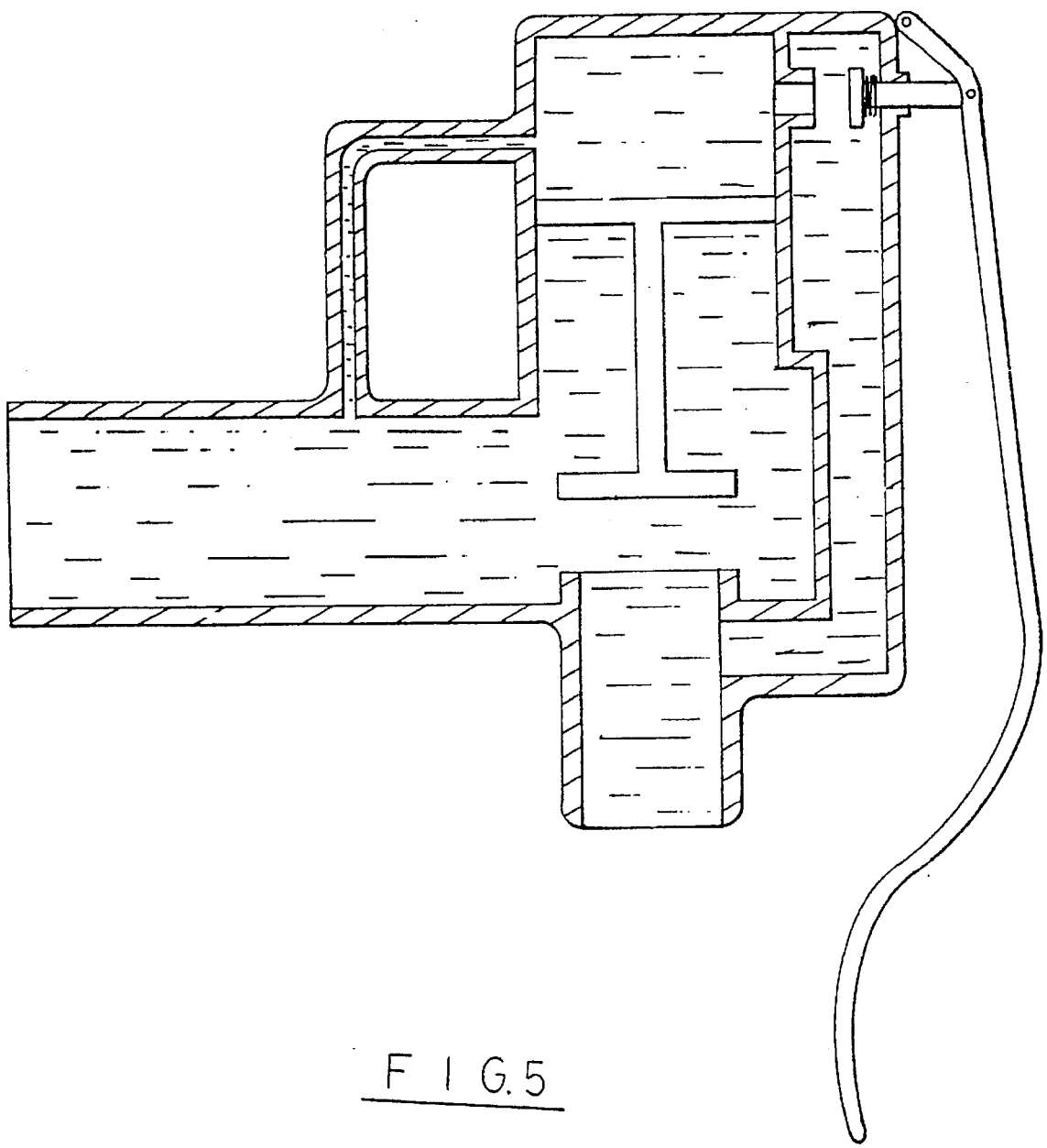
FIG. 5 is a sectional view of a touch-control water flow, control device according to the prior art.

Referring to FIG. 4, and FIGS. 1 and 2 again, the aforesaid locating mechanism comprises a plurality of longitudinal grooves 142 equiangularly spaced around the inside wall of the upright inside tube 14, sets of longitudinal rails raised around the inside wall of the upright inside tube 14 and spaced by the longitudinal grooves 142, wherein each set of longitudinal rails is comprised of three rails of different lengths, namely, the long rail 143 at one side, the medium rail 144 at an opposite side, and the short rail 145 closely connected between the long rail 143 and the medium rail 144 in a parallel relation. The thickness of the short rail 145 is less than that of the long rail 143 and the medium rail 144. The long rail 143, the medium rail 144, and the short rail 145 have a respective top end terminating in a bevel top edge 1431, 1441 sloping in the same direction. The bevel top edge of the medium rail 144 and the bevel top edge of the short rail 145 are arranged in line so that they are commonly referenced by 1441. The control rod 4 comprises a head 42 stopped by and above the inside annular flange 141, an elongated rod body 41 extending downwards from the head 42 and extending out of the inside annular flange 141 of the upright inside tube 14, a plurality of longitudinal teeth 421 raised around the head 42 and which engage with the longitudinal grooves 142 of the upright inside tube 14, and a recessed top hole 40 for receiving the rotary actuating rod 5. When the control rod 4 is installed, it can be moved axially in the upright inside tube 14. The rotary actuating rod 5 comprises a rod body 51 inserted into the recessed top hole 40 of the control rod 4, a recessed top hole 50 for receiving the valve element 3, and a plurality of locating blocks 52 raised around the top end of the rod body 51 and having a respective bevel bottom edge 521 respectively disposed so as to be in contact with the bevel top edges 1431, 1441 of the longitudinal rails 143, 144, 145. The bevel bottom edges 521 of the locating blocks 52 slope in the same direction as that of the bevel top edges 1431, 1441. Therefore the locating blocks 52 can be smoothly and slidably moved over and along the bevel top edges 1431, 1441. When the locating blocks 52 are stopped at the bevel top edges 1431, 1441, the rotary actuating rod 5 is disposed at the high level position allowing water flow. By turning the rotary actuating rod 5 relative to the inside upright tube 14, the locating blocks 52 can be moved over and off the longitudinal rails and into the longitudinal grooves 142 (a locating block 52 in each of these positions is shown in FIG. 4). When the locating blocks 52 are moved into the longitudinal grooves 142, they are stopped above the head 42 of the control rod 4, and the rotary actuating rod 5 is disposed at the low level position preventing water flow.

Referring to FIGS. 1 and 2 again, the cup-like mounting base 2 is internally threaded and threaded onto the threaded neck 11 of the casing 1. The mounting base has an outer thread 21 threaded into the internally threaded water discharging pipe 6 of a faucet or water supply system, and there is a water input port 23 at the top for guiding water from the water discharging pipe 6 to the casing 1. A step 22 is provided above the outer thread 21 around the water input port 23, a water sealing ring 24 mounted around the step 22, and a tubular holder 20 is located on the inside. The valve stem 3 comprises an element body 31 inserted through the annular rubber gasket 15, the plastic washer 16, and the annular water sealing rubber 17. The stem body 31 has one end slidably received into the recessed top hole 50 of the rotary actuating rod 5. The valve element 3 further comprises a top coupling section 34 slidably and rotatably received the tubular holder 20 as it moves between an open and closed position as the valve element 3 moves away from into engagement with the gasket 15, a valve element seating 32 around the connecting area between the stem body 31 and the top coupling section 34 and detachably stopped above the annular rubber gasket 15, and a hollow conical flange 33 raised from the valve element seating 32 and spaced around the top coupling section 34 and stopped against the outside wall of the tubular holder 20.

Figure 3:
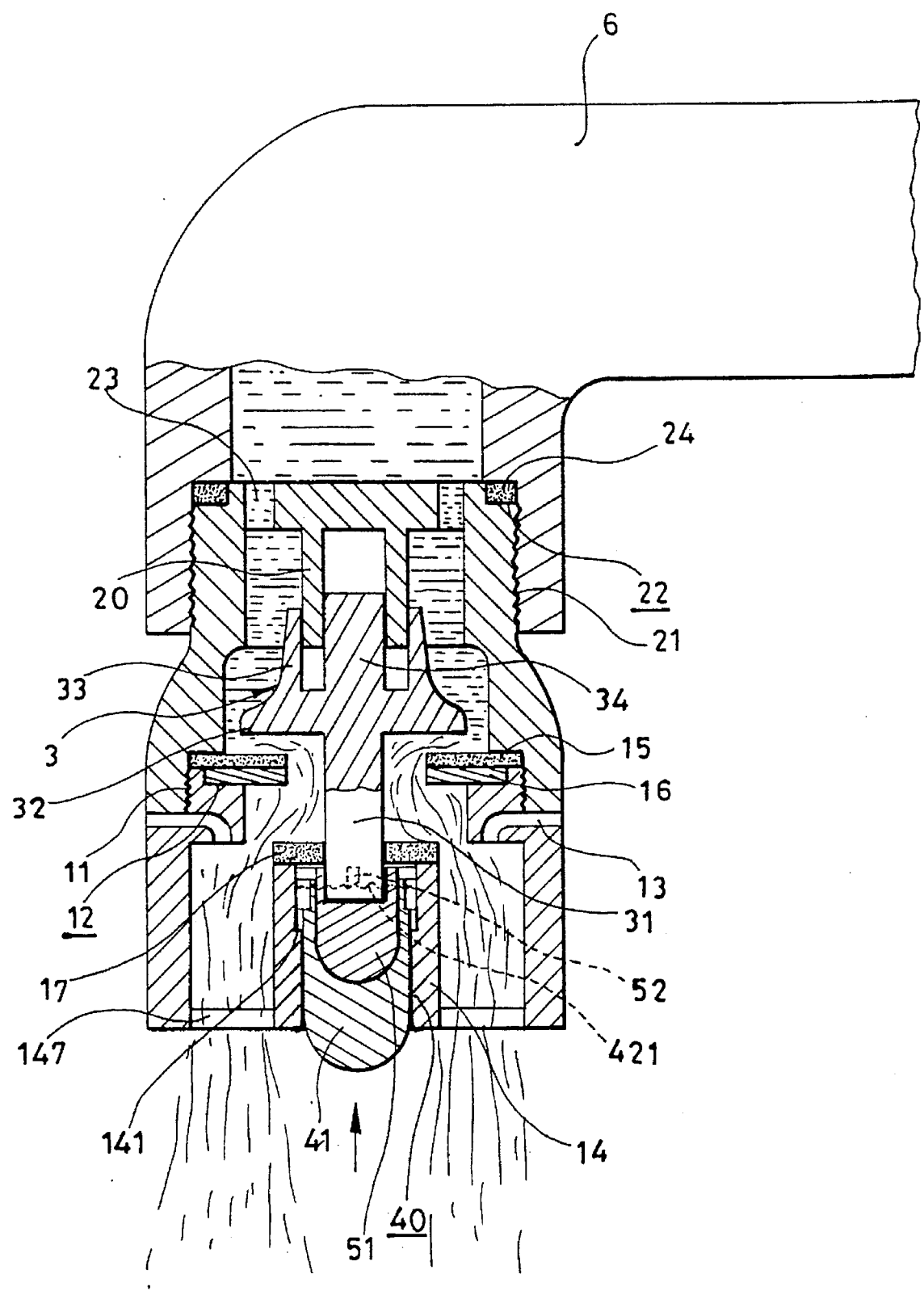
FIG. 3 is similar to FIG. 2 but showing the valve stem lifted, and the water passage opened.

Referring to FIG. 3 and FIG. 2 again, when the water flow control device is installed, the locating blocks 52 are disposed at the low level position, and the water passage between the cup-like mounting base 2 and the casing 1 is sealed by the annular rubber gasket 15 and the valve element seating 32 of the valve element 3. Therefore water is stopped in the cup-like mounting base 2 (see FIG. 2); when the user pushes the rod body 41 of the control rod 4 upwards with the hand, the rotary actuating rod 5 and locating blocks 52 will be lifted upwards, thereby causing the bevel bottom edges 521 of the locating blocks 52 to rotate and slide onto the bevel top edges 1441 and stop against the long rails 143. When the bevel bottom edges 521 of the locating blocks 52 are forced into engagement with bevel top edges 1441 and stopped against the long rails 143, the valve element seating 32 is lifted from the annular rubber gasket 15, permitting water to pass from the cup-like mounting base 2 to the casing 1 to flow out of the casing 1 through the water discharging port 146 (see FIG. 3).

It is to be understood that the drawings are designed for purposes of illustration only, and are not intended as a definition of the limits and scope of the invention disclosed.

I claim:

1. A water flow control device comprising:
  a cup-like mounting base for fastening to the water discharging pipe of a water supply system and sealed by a water sealing ring, the mounting base having an inner tubular holder, and a water input port for passing water from said water discharging pipe;
  a hollow cylindrical casing fastened to said cup-like mounting base having a water discharging port at a bottom side thereof and an upright inside tube mounted in said water discharging port by radial ribs, said upright inside tube having an inside annular flange near a bottom side thereof;
  an annular water sealing rubber fastened to a top edge of said upright inside tube;
  a plastic washer mounted inside said casing above said annular water sealing rubber;
  an annular rubber gasket mounted in said casing and supported by said plastic washer, defining a water passage for water from the water input port of said cup-like mounting base to the water discharging port of said casing;
  a valve element slidably received by the tubular holder of said cup-like mounting base and axially movable to close and open the water passage of said annular rubber gasket;
  a control rod at least partially mounted in said upright inside tube for moving by hand, said control rod having a head stopped above the inside annular flange of said upright inside tube and a rod body projecting out of said upright inside tube;

a rotary actuating rod coupled to said control rod and moved by said control rod between a first position in which said valve element is moved to open the water passage of said annular rubber gasket, and a second position in which said valve element is moved to close the water passage of said annular rubber gasket; and a locating mechanism disposed on the inside of said upright inside tube for holding said control rod and said rotary actuating rod in either said first position and or said second position as said control rod and said rotary actuating rod are moved to different locations along said locating mechanism.

2. The water flow control device of claim 1 wherein said locating mechanism comprises a plurality of longitudinal grooves equiangularly spaced around said upright inside tube on the inside, and sets of longitudinal rails raised around said upright inside tube on the inside and spaced by said longitudinal grooves, each set of longitudinal rails comprised of a long rail at one side, and a medium rail at an opposite side, and a short rail closely connected between said long rail and said medium rail, the thickness of said short rail being less than that of said long rail and said medium rail, each rail having a respective top end terminating in a bevel top edge sloping in the same direction, the bevel top edge of said medium rail and the bevel top edge of said short rail being arranged in line; said control rod has a plurality of longitudinal teeth raised around the head thereof and engaged with the longitudinal grooves of said upright inside tube, and a recessed top hole coupled to said rotary actuating rod; said rotary actuating rod comprises a rod body fitted into the recessed top hole of said control rod, a recessed top hole, which slidably receives said valve element, and a plurality of beveled locating blocks raised around a top end of the rod body thereof and moved into the longitudinal grooves of said upright inside tube, said beveled locating blocks being moved out of the longitudinal grooves of said upright inside tube into engagement with the bevel top edges of said longitudinal rails when said rotary actuating rod is moved to said first position.

3. The water flow control device of claim 1 wherein said valve element comprises a stem body slidably inserted through said annular rubber gasket, said plastic washer, and said annular water sealing rubber, into the recessed top hole of said rotary actuating rod, a top coupling section slidably inserted into said tubular holder, a valve element seating raised around a connecting area between said stem body and said top coupling section and detachably stopped above said annular rubber gasket to seal said water passage, and a hollow conical flange raised from said valve element seating and spaced round said top coupling section and stopped against a periphery of said tubular holder.

4. The water flow control device of claim 1 wherein said cup-like mounting base has an inner thread at a bottom end thereof; and said casing has a threaded neck threaded into the inner thread of said cup-like mounting base.

* * * * *